Figure 1:
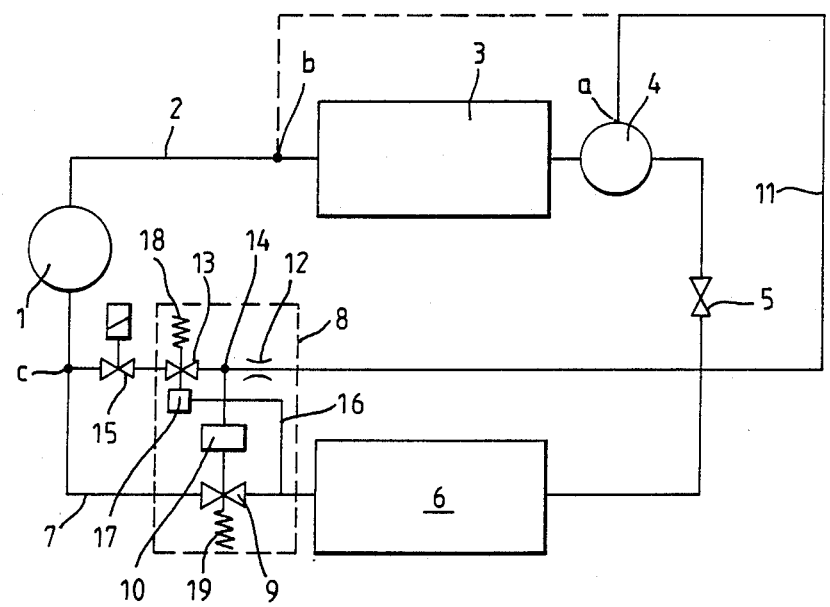

United States Patent [19]

Barbier

[11] Patent Number: 4,934,156
[45] Date of Patent: Jun. 19, 1990

[54] EVAPORATOR PRESSURE REGULATING VALVE CONTROLLED BY AN AUXILIARY FORCE FOR A REFRIGERATOR INSTALLATION

[75] Inventor: William J. Barbier, Hazelwood, Mo.

[73] Assignee: Danfoss A/S, Nordborg, Denmark

[21] Appl. No.: 373,508

[22] Filed: Jun. 30, 1989

[30] Foreign Application Priority Data

Jul. 16, 1988 [DE] Fed. Rep. of Germany ....... 3824235

[51] Int. Cl.$^5$ .............................................. F25B 41/04
[52] U.S. Cl. ...................................... 62/217; 137/489; 236/80 R
[58] Field of Search ........................ 62/217; 236/80 R; 138/44; 137/489, 492.5

[56] References Cited

U.S. PATENT DOCUMENTS

| | | | |
|---|---|---|---|
| 668,766 | 2/1901 | Bickel | 236/87 X |
| 2,648,285 | 8/1953 | Johnson | 138/44 X |
| 4,442,680 | 4/1984 | Barbier et al. | 62/217 |

Primary Examiner—William E. Wayner
Attorney, Agent, or Firm—Wayne B. Easton

[57] ABSTRACT

In a refrigeration system there is provided a main valve that has its inlet port fluidly connected to an evaporator while its outlet port is fluidly connected to the suction port of a motor-compressor. The closing of the main valve is controlled by an auxiliary valve, the auxiliary valve being connected in an auxiliary line that at one end opens to the gas port of a condenser or to a line between the condenser and the motor compressor. The auxiliary valve is connected in the auxiliary line in series with a fixed throttle and is downstream of the throttle. The closure member of the auxiliary valve opens on an increase in the evaporator pressure. A check valve, for example a two way magnetic valve, is connected between the auxiliary valve and the suction port. An auxiliary chamber, when the auxiliary valve is in an open condition establishes an open fluid flow path from the evaporator to the magnetic valve, the pressure in the auxiliary chamber acting against the main valve closure member for urging it toward its closed condition.

5 Claims, 1 Drawing Sheet

EVAPORATOR PRESSURE REGULATING VALVE CONTROLLED BY AN AUXILIARY FORCE FOR A REFRIGERATOR INSTALLATION

The invention relates to an evaporator pressure regulating valve controlled by an auxiliary force for a refrigerator installation, comprising a main valve in the suction line of which the closure member is biased in the opening direction by a spring and in the closing direction by an auxiliary pressure which is derivable between two throttling points in an auxiliary line connecting a connection at a higher system pressure to a connection behind the main valve, one of the throttling points being given and the other being formed by an auxiliary valve of which the closure member is displaceable depending on the evaporator pressure, particularly comprising a check-valve in the auxiliary line downstream of the throttling points.

In a known evaporator pressure regulating valve of this kind controlled by an auxiliary force (U.S.-PS 44 42 680), the throttling point formed by the auxiliary valve is upstream of the fixed throttling point and a magnetic valve for shutting the auxiliary line is disposed downstream thereof. With increasing evaporator pressure, the auxiliary valve moves in the closing direction. At its seat, there is a groove which forms a bypass throttle when the auxiliary valve is closed. This permits communication between the connection at higher system pressure and the auxiliary pressure chamber even when the auxiliary valve is closed, so that the main valve can close when the check-valve in the form of a magnetic valve is closed. The refrigerant flowing through the auxiliary line calls for a certain amount of control energy which reduces the refrigeration performance.

Such pressure regulating valves are used particularly in the refrigeration installations of supermarkets where several individual evaporators are disposed in parallel and are to be individually separated from the suction line for defrosting. In this case the main valve operates as a regulating valve and also as a check-valve.

The invention is based on the problem of reducing the control power consumption in an evaporator pressure regulating valve of the aforementioned kind.

This problem is solved according to the invention in that the auxiliary valve is downstream of the fixed throttling point and its closure member opens with increasing evaporator pressure.

This construction is based on the consideration that refrigeration plants run at a low load throughout most of the operating period, higher loads appearing only when new products are introduced or after a defrosting period has ended. According to the invention, the throttling resistance in the auxiliary line decreases and the control power increases with an increase in load. This is in contrast with known constructions. Consequently, one works at a low power throughout most of the operating period. Since the lowest power input is associated with the lowest load and thus with the lowest refrigeration performance. the compressor output reaches extraordinarily low values at a low load. Altogether, the losses in refrigerant fluid caused by the flow through the auxiliary line can be reduced by more than 90%. In addition, one can dispense with a bypass throttle at the auxiliary valve because the auxiliary force chamber constantly communicates by way of the fixed throttle with the connection at higher system pressure. Upon closing the check-valve, therefore, the main valve can close very rapidly in the manner of a magnetic valve.

It is particularly favourable if the fixed throttling point is formed by at least two series-connected throttling bores with a chamber of larger cross-section therebetween. In this way, one obtains the desired throttling resistances without having to make the throttling bore too long or with too small a diameter.

Preferably, the closure member of the main valve is part of a piston of which the area covering the seat passage is smaller than the area subjected to the auxiliary pressure and is surrounded by an unbalanced area amounting to from 10 to 35%, preferably 24%, of the area covering the seat passage. The unbalanced area is impinged during operation by a pressure reduced by a pressure drop, so that a higher closing force acts on the closure member. This reduces the evaporator pressure change necessary for effecting throttling of the main throughpassage. The evaporator pressure is thereby kept closer to the desired value when the refrigerating load of the evaporator alters. In addition, the unbalanced area ensures that, during defrosting with hot gas, a closing force adequate for securely closing the main valve is available.

The construction according to the invention enables a simple two-way magnetic valve to be employed for the check-valve.

The invention also permits a construction in which the closure member of the auxiliary valve is formed by a valve pin which is frictionally connected to the output element of a diaphragm pressure box of which the diaphragm is biased in the opening direction by the vapour pressure and in the closing direction by a desired value spring. The use of the directly controlled valve pin brings about a considerable simplification in construction.

From a constructional point of view, it is advisable to have an upper valve housing portion with a stepped longitudinal bore and two axially offset diagonal blind transverse bores, wherein the transverse input bore opens into the longitudinal section of larger diameter forming an auxiliary chamber and receives a connecting nipple with a built-in fixed throttling point, and wherein the transverse output bore opens between the longitudinal bore section of medium diameter which receives an insert with the seat of the auxiliary valve and the longitudinal bore section of smaller diameter which guides the closure member of the auxiliary valve. Such an upper portion is easy to make and assemble. It is merely necessary to bring the auxiliary force chamber into communication with the main valve.

This is achieved in a particularly simple manner in that the valve housing cover having a nipple and connected to the main valve housing bounds the auxiliary force chamber and comprises a stepped longitudinal bore in the cover, that the closure member of the main valve is a stepped piston which is guided in the stepped longitudinal bore of the cover, and that passages connect the auxiliary chamber to the stepped chambers formed by the steps of the bore and the piston. The upper portion of the valve housing engages over the nipple from which the stepped piston extends with its section of smaller diameter.

To compensate for tolerance differences, the seat of the auxiliary valve may be axially adjustable.

Figure 2:
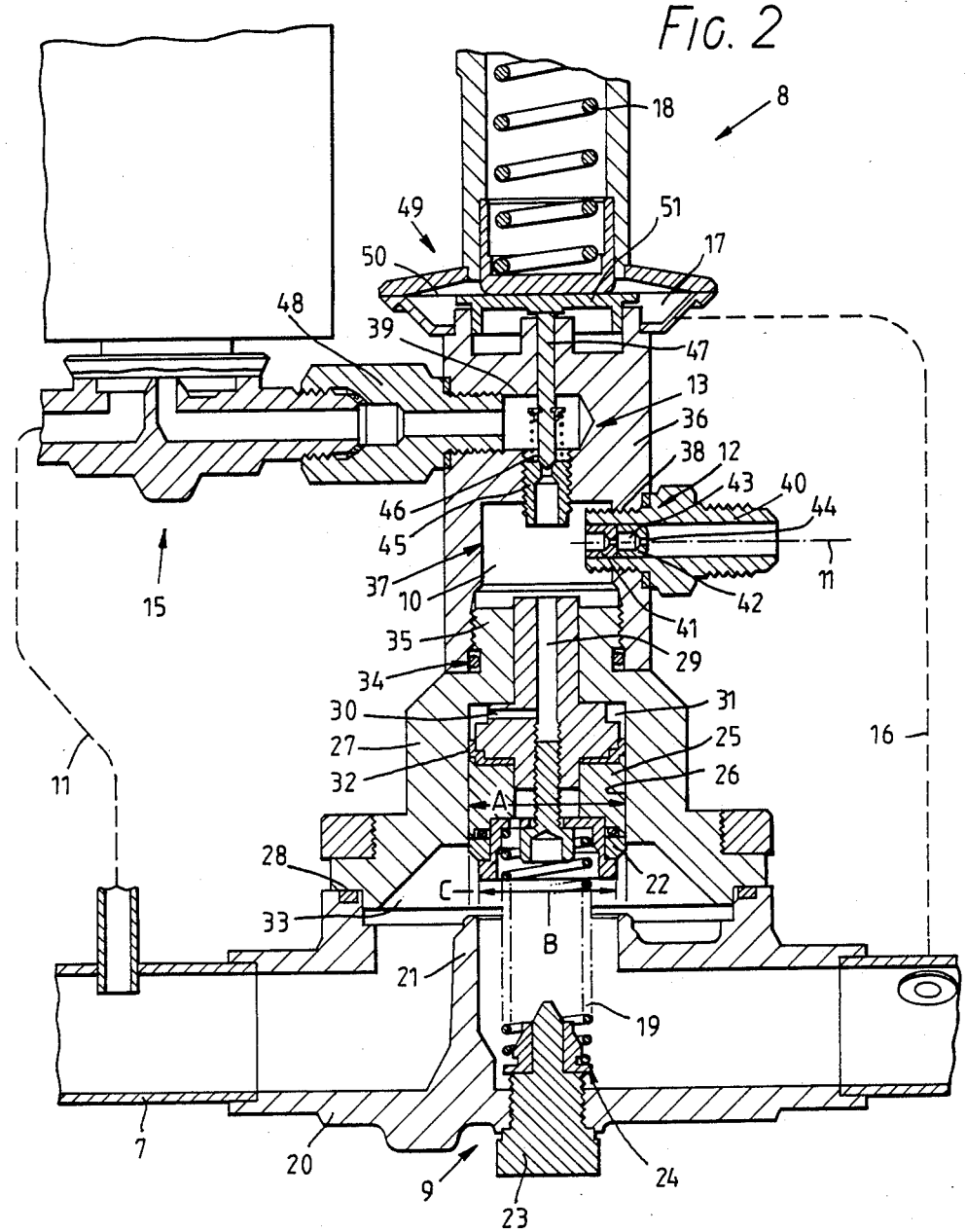

A preferred example of the invention will now be described in more detail with reference to the drawing, wherein:

FIG. 1 is the circuit of a refrigeration installation comprising an evaporator pressure regulating valve according to the invention and FIG. 2 is a partial section through such a valve.

FIG. 1 illustrates a refrigeration installation in which a motor-compressor 1 conveys refrigerant through a pressure conduit 2 into a condensor 3 which is followed by a collector 4 for liquid refrigerant. The liquid refrigerant flows through an expansion valve 5 into an evaporator 6 which is connected to the motor-compressor 1 by way of a suction conduit 7.

An evaporator pressure regulating valve 8 comprises a main valve 9 in the suction conduit 7 which is provided with an auxiliary (pilot) force chamber 10. To produce the auxiliary force, there is an auxiliary conduit 11 which leads from a connection at a higher system pressure, e.g. a connection a on the vapour chamber of the collector (receiver) 4 or a connection b at the pressure conduit 2, to a connection c behind the main valve. The auxiliary conduit comprises a fixed throttle point 12 and an auxiliary valve 13 connected in series. By reason of the pressure drops, an intermediate pressure which determines the auxiliary force is obtained at a tapping 14 therebetween. Downstream, there is a two-way magnetic valve 15 which permits the auxiliary conduit 11 to be shut.

The auxiliary (pilot) valve 13 is controlled depending on the evaporator pressure which is supplied through a control conduit 16 of a pressure chamber 17. An adjustable desired value spring 18 acts in the opposite direction. With an increase in the evaporator pressure, the opening cross-section of the auxiliary valve 13 increases. Consequently, the intermediate pressure at the tapping 14 and thus the auxiliary force in the auxiliary force chamber 10 decreases. The main valve 9, which is biased in the closing direction by the auxiliary force and in the opening direction by a spring 19, therefore receives a larger opening cross-section. This leads to a reduction in the evaporator pressure to the desired value. With an evaporator pressure that is too low, the regulating procedure is the reverse.

At a low evaporator load, the evaporator pressure drops so that the auxiliary valve as well as the main valve are brought into the vicinity of the closing position. The power loss of the refrigerant flowing through the auxiliary conduit 11 is correspondingly low. At a high load and correspondingly higher evaporator pressure, however, the main valve 9 can be fully opened. The magnetic valve 15 is deliberately closed when the evaporator 9 is to be defrosted. By blocking the auxiliary conduit, the full higher system pressure builds up in the auxiliary force chamber 10 and closes the main valve 9. Defrosting takes place through the lack of circulation of refrigerant or as the result of a supply of hot gas.

In the construction of FIG. 2, corresponding parts are given the same reference numerals as in FIG. 1.

A valve housing 20 comprises a valve seat 21 for the closure member 22 of the main valve 9. A screw 23 carries a spring plate 24 for supporting the opening spring 19. The closure member 22 is formed on a stepped piston 25 which is guided in a stepped longitudinal bore 26 of a valve housing cover 27 which is secured to the main valve housing 20 with the interpositioning of a seal 28. The stepped piston 25 comprises an axial bore 29 and a radial bore 30 by which a stepped chamber 31 formed between the step of the stepped piston 25 and the step of the stepped bore 26 is connected to the auxiliary force chamber 10. This stepped chamber is sealed from the valve chamber 33 by a seal 32.

The piston cross-section is therefore loaded over its entire area A by the auxiliary pressure. This area A is larger than the area B covering the seating passage. One is therefore left with an annular area C which is unbalanced because it is not impinged by the evaporator pressure but by a relatively reduced pressure.

With the interpositioning of a seal 34, an upper portion 36 of the housing is screwed on to a spigot 35 of the cover 27. This upper portion has a stepped longitudinal bore 37 and a transverse input bore 38 and a transverse output bore 39. The transverse input bore 37 opens into the longitudinal bore section of larger diameter forming the auxiliary force chamber 10. It receives a connecting nipple 40 containing two throttling inserts 41 and 42. Each throttling insert comprises a chamber 43 and a throttling bore 44. The transverse output bore 39 opens between a longitudinal bore section of medium diameter receiving an insert 45 for forming the auxiliary valve seat 46 and a longitudinal bore section of smaller diameter guiding the pin-like closure member 47 of the auxiliary valve 13. The insert 45 has a screw connection so that the axial position of the seat 46 is adjustable. A connecting nipple 48 is screwed into the transverse output bore 39 and carries the magnetic valve 15.

At the top, a pressure box 49 having a diaphragm 50 is arranged on the upper portion 36. The diaphragm is loaded from above by the adjustable desired value spring 18 and from below by the evaporator pressure in the pressure chamber 17. It acts on the pin-like closure member 47 of the auxiliary valve by way of an output element 51.

The passages 29 and 30 ensure that the entire cross-section of the stepped piston 25 is impinged by the pressure in the auxiliary force chamber 10. The evaporator pressure and the opening spring 19 act in the opposite direction. There are therefore no difficulties in selecting the intermediate pressure so that the desired opening position is achieved. When the main valve 9 is closed, the area of the closure member impinged by the evaporator pressure is reduced. The closed position is therefore certain to be maintained. When the magnetic valve 15 closes, the condensor pressure can be formed in the auxiliary force chamber 10 so that even very high evaporator pressures will not be able to open the main valve.

Altogether, one obtains a very simple construction from the point of construction and manufacture. Obviously, many changes can be made from the illustrated construction without departing from the basic concept of the invention. Thus, the fixed throttle points 12 and the auxiliary valve 13 may be disposed separate from the main valve. It is then only necessary to have one conduit at intermediate pressure leading from the tapping 14 to the auxiliary force chamber 10. The expansion valve 5 can also be replaced by a throttling point.

I claim:

1. Evaporator pressure regulating valve apparatus fluidly connected between the suction port of a motor-compressor, a gas port of a receiver and an outlet port of an evaporator that is at a lower pressure than that at the gas port that form part of a refrigerator system, comprising a main valve that has a housing having an outlet port adapted for connection to the suction port, an inlet port adapted for connection to the evaporator port, first means defining a first valve seat and a fluid passage extending through the first valve seat for fluidly connecting the housing inlet port to the housing outlet port, an axial first bore opening to the first valve seat, and a pilot chamber opening to the first bore remote from the first valve seat and a pilot first port opening to the pilot chamber and adapted for fluid connection to the gas port, a first closure member mounted in the first bore between the first valve seat and the pilot chamber for movement to a closed first position by pressurized fluid in the pilot chamber and to an open second position, a spring for resiliently urging the first closure member to its open position, a fixed throttle point connected to the pilot port for opening to the pilot chamber and adapted for connection to the gas port, auxiliary valve means for controlling downstream fluid flow from the pilot chamber and the throttle point, and check valve means connected in series with the auxiliary valve means and adapted for connection to the suction port for blocking downstream fluid flow from the pilot chamber to the suction port when the evaporator is being defrosted and otherwise being open, the auxiliary valve means including a second valve seat, a second fluid passage extending from the auxiliary chamber, through the second valve seat and to the check valve, and closure means adapted for fluid connection to the evaporator for closing the second valve seat, and opening for permitting fluid flow through the second valve seat with increasing evaporator pressure, the closure means includes a second closure member that is axially movable relative to the second valve seat between a first position for permitting fluid flow through the second valve seat and a second position for blocking fluid flow through the second valve seat and the auxiliary valve means including means for mounting the second closure member for axial movement between its positions and means mounted by the housing for mounting the second valve seat for selected axial adjustment relative to the housing.

2. Evaporator pressure regulating valve apparatus according to claim 1, characterized in that the check valve means is a two way magnetic valve.

3. Evaporator pressure regulating valve apparatus according to claim 1, characterized in that the closure member comprises a piston having a first surface area subjected to the pressure in the auxiliary chamber to exert a force for moving the closure member toward to the first valve seat and an opposite second area that is defined by a first surface portion that is of an area smaller than the first surface for closing the first valve seat and a second surface portion defining an unbalanced surface area that amounts from about 10% to 35% of the first surface portion.

4. Evaporator pressure regulating valve apparatus fluidly connected between the suction port of a motor-compressor, a gas port of a receiver and an outlet port of an evaporator that is at a lower pressure than that at the gas port that form part of a refrigerator system, comprising a main valve that has a housing having an outlet port adapted for connection to the suction port, an inlet port adapted for connection to the evaporator port, first means defining a first valve seat and a fluid passage extending through the first valve seat for fluidly connecting the housing inlet port to the housing outlet port, an axial first bore opening to the first valve seat, and a pilot chamber opening to the first bore remote from the first valve seat and a pilot first port opening to the pilot chamber and adapted for fluid connection to the gas port, a first closure member mounted in the first bore between the valve seat and the pilot chamber for movement to a closed first position by pressurized fluid in the pilot chamber and to an open second position, a spring for resiliently urging the first closure member to its open position, a fixed throttle point connected to the pilot first port for opening to the pilot chamber and adapted for connection to the gas port, auxiliary valve means for controlling downstream fluid flow from the pilot chamber and the throttle point, and check valve means connected in series with the auxiliary valve means and adapted for connection to the suction port for blocking downstream fluid flow from the pilot chamber to the suction port when the evaporator is being defrosted and otherwise being open, the auxiliary valve means including a second valve seat, a second fluid passage extending from the auxiliary chamber, through the second valve seat and to the check valve, and closure means adapted for fluid connection to the evaporator for closing the second valve seat, and opening for permitting fluid flow through the second valve seat with increasing evaporator pressure, the housing including an upper portion that in part defines the auxiliary valve means, including a longitudinal stepped bore having a first bore portion defining a part of the pilot chamber, a second bore portion of a smaller diameter than the first bore portion and a third bore portion axially opposite of the second bore portion and from the first bore portion, and of a smaller diameter than the second bore portion, the second bore portion having opposite ends opening to the first and third bore portions respectively, a first transverse bore that defines the auxiliary first port and forms an inlet opening to the pilot chamber and a second transverse bore axially offset from the first transverse bore forming an outlet that defines part of the second fluid passage and opens to the third bore portion axially opposite the second valve seat from the pilot chamber, the second valve seat being defined by an insert mounted in the second bore portion, the closure means including a second closure member extended into the third bore portion for being guided by the upper portion to move between a position blocking the second valve seat and permitting fluid flow through the second valve seat, and the fixed throttle point including a nipple mounted by the housing upper portion to extend through the first transverse bore and means mounted by the nipple that forms the built-in fixed throttle point.

5. Evaporator pressure regulating valve apparatus according to claim 4, characterized in that the housing includes a valve housing cover mounting the housing upper portion and having an axial second stepped bore having a fourth bore portion opening to the auxiliary chamber and a fifth bore portion opening to the fourth bore portion and toward the first valve seat and of a larger diameter than the fourth bore portion, the first bore including at least the second stepped bore, and that the first closure member includes a stepped piston mounted in the second stepped bore for axial movement and having a first piston portion extending within the fourth bore portion and a second piston portion in fluid sealing relationship with the fifth bore portion, the piston and fifth stepped bore portion defining a stepped chamber axially between the fifth bore portion and the opening of the fifth bore portion to the fourth bore portion, and that the piston has a fluid passage opening to the auxiliary chamber and to the stepped chamber.

* * * * *